United States Patent
Hanson et al.

(10) Patent No.: US 9,080,117 B2
(45) Date of Patent: Jul. 14, 2015

(54) BIOFUEL PRODUCTION METHOD AND SYSTEM

(75) Inventors: Arlis Hanson, Bath, SD (US); Anton Angelo Thompkins, Valparaiso, IN (US); Nicholas Joseph Sever, Portage, IN (US); Richard Lee Peterson, Aberdeen, SD (US); Luke Christopher Ice, Fort Wayne, IN (US)

(73) Assignee: GER ENTERPRISES, LLC, Fort Wayne, IN (US)

( * ) Notice: Subject to any disclaimer, the term of this patent is extended or adjusted under 35 U.S.C. 154(b) by 0 days.

(21) Appl. No.: 13/094,502

(22) Filed: Apr. 26, 2011

(65) Prior Publication Data

US 2011/0258911 A1    Oct. 27, 2011

Related U.S. Application Data

(63) Continuation-in-part of application No. 12/357,804, filed on Jan. 22, 2009, now abandoned.

(60) Provisional application No. 61/022,678, filed on Jan. 22, 2008.

(51) Int. Cl.
*B01J 19/00* (2006.01)
*B01J 3/02* (2006.01)
(Continued)

(52) U.S. Cl.
CPC .... *C10L 1/00* (2013.01); *B01J 3/02* (2013.01); *B01J 3/04* (2013.01); *B01J 19/0066* (2013.01); *C10G 1/08* (2013.01); *C10G 3/42* (2013.01); *C10L 1/02* (2013.01); *C10L 1/026* (2013.01); *C10L 1/04* (2013.01); *C10L 1/19* (2013.01); *C11C 3/003* (2013.01); *C10G 2300/1014* (2013.01); *C10G 2300/1018* (2013.01); *Y02E 50/13* (2013.01)

(58) Field of Classification Search
CPC ............... B01J 2/00; B01J 3/03; B01J 3/04; B01J 2219/00006; B01J 2219/00103; B01J 2219/00783; B01J 2219/00873; B01J 2219/00889; B01J 14/00; B01J 19/00; B01J 19/26; B01J 19/006; B01F 1/00; B01F 5/00; C10L 1/02; C10L 1/04; C10L 1/06; C10L 1/08; C10L 1/10; C10L 1/14; Y02E 50/10; Y02E 50/30; Y02E 50/32
USPC ............ 422/129, 187, 224, 242; 44/300, 307, 44/629
See application file for complete search history.

(56) References Cited

U.S. PATENT DOCUMENTS 4,081,863 A * 3/1978 Rees .......................... 366/176.2
4,556,576 A   12/1985 Gaehring
(Continued)

FOREIGN PATENT DOCUMENTS

WO    WO 2007/058636 A2 * 5/2007

OTHER PUBLICATIONS

Written Opinion of the International Searching Authority for International Application No. PCT/US12/35025, which claims priority to the U.S. Appl. No. 13/094,502 (the present application), Jul. 18, 2012.

*Primary Examiner* — Natasha Young
(74) *Attorney, Agent, or Firm* — McDonnell Boehnen Hulbert & Berghoff (57) ABSTRACT

In an embodiment of the present invention, a renewable energy fuel is prepared by a process including the steps of: a) providing a renewable energy feedstock; b) providing an alcohol; c) providing a catalyst; d) mixing (a), (b), and (c) to form a blend; and e) homogenizing the blend at a pressure greater than 400 kilogram-force per square centimeter (Kg/cm2).

10 Claims, 5 Drawing Sheets

(51) Int. Cl.
*C10G 1/08* (2006.01)
*C10G 3/00* (2006.01)
*C10L 1/19* (2006.01)
*C11C 3/00* (2006.01)
*B01J 3/03* (2006.01)
*B01J 3/04* (2006.01)
*B01J 14/00* (2006.01)
*B01F 1/00* (2006.01)
*B01F 5/00* (2006.01)
*C10L 1/00* (2006.01)
*C10L 1/02* (2006.01)
*C10L 1/04* (2006.01)
*C10L 1/06* (2006.01)
*C10L 1/08* (2006.01)
*C10L 1/10* (2006.01)
*C10L 1/14* (2006.01)

(56) References Cited

U.S. PATENT DOCUMENTS

| | | |
|---|---|---|
| 5,487,965 A | 1/1996 | Odell |
| 8,256,471 B2 * | 9/2012 | Selles ................. 141/2 |
| 8,496,472 B2 * | 7/2013 | Roberts et al. ............ 431/9 |
| 2002/0015855 A1 * | 2/2002 | Sajoto et al. ............. 428/639 |
| 2005/0120621 A1 | 6/2005 | Lawson et al. |
| 2007/0175092 A1 * | 8/2007 | Ames ..................... 44/629 |
| 2008/0282606 A1 | 11/2008 | Plaza et al. |
| 2009/0030215 A1 | 1/2009 | Dignan et al. |
| 2009/0185963 A1 | 7/2009 | Hanson |
| 2009/0260280 A1 | 10/2009 | Klausmeier |

* cited by examiner

BIOFUEL PRODUCTION METHOD AND SYSTEM

CROSS-REFERENCE TO RELATED APPLICATIONS

This is a Continuation in Part application and claim priority to U.S. patent application Ser. No. 12/357,804 entitled METHOD FOR MAKING DIESEL FUEL ADDITIVE, filed Jan. 22, 2009, which claims priority to Provisional Patent Application No. 61/022,678, filed Jan. 22, 2008, the disclosures of which are incorporated by reference herein.

FIELD OF THE INVENTION

The present invention generally relates to the manufacture of fuel. More particularly, the present invention pertains to a method, device and system for manufacturing renewable biofuel.

BACKGROUND OF THE INVENTION

Biodiesel is produced via a reaction of vegetable oil or animal fat with an alcohol (usually methanol) and a catalyst. Biodiesel is chemically distinct from petroleum diesel and has a separate ASTM standard (D6751), which specifies the standard for biodiesel for use as a blend component with petroleum diesel. As approved by the United States Environmental Protection Agency, ("EPA"), the manufacture of biofuel has involved two conventional processes: transesterification and hydrotreating.

Transesterification involves the chemical replacement of glycerol in a triglyceride with an ester of an alcohol molecule. The process forms two principal products, fatty acid methyl esters or FAME, the chemical name for biodiesel, and glycerin. In this reaction, a vegetable oil or fat reacts with an esterifying agent, usually an alcohol, with or without a catalyst and with the input of additional energy, normally at atmospheric pressure. The reaction time can vary from about 0.5 to about 8 hours depending on the temperature and whether or not a catalyst is used.

Thus, transesterification typically proceeds slowly and generates a great deal of glycerol and some water which must be removed from the biofuel before it can be used. In addition to these byproducts, other byproducts such as alcohols, soaps, caustic agents and the like, may be present as a result of using excess reactants and catalysts to drive the reaction faster. If not removed, any of these byproducts may prevent the biofuel from being burned in a combustion engine or the byproducts may cause harm to the engine.

Hydrotreating is a process traditionally used by petroleum refineries to remove sulfur impurities from diesel fuel. Renewable diesel produced using this process can either be produced in a "bio-only" unit that uses only vegetable oils or animal fats as feedstock or where oils or fats are co-processed with the distillate fractions (diesel fuel) derived from petroleum. Both processes produce a mixture of hydrocarbons that has been reported to meet the ASTM standard for petroleum diesel (D975). The process also produces propane, carbon dioxide, and water from the oil/fat feedstock. However, hydrotreating has less desirable cold flow properties.

Accordingly, it is desirable to provide a method, device and system for manufacturing biofuel from renewable resources that is capable of overcoming the disadvantages described herein at least to some extent.

SUMMARY OF THE INVENTION

The foregoing needs are met, to a great extent, by the present invention, wherein in some embodiments a method, device and system for manufacturing biofuel from vegetable oil are provided.

In an embodiment of the present invention, a renewable energy fuel is prepared by a process including the steps of: a) providing a renewable energy feedstock; b) providing an alcohol; c) providing a catalyst; d) mixing (a), (b), and (c) to form a blend; and e) homogenizing the blend at a pressure greater than 400 kilogram-force per square centimeter (Kg/cm2).

In another embodiment of the present invention, a method of preparing a biofuel includes the steps of: a) providing a renewable energy feedstock; b) providing an alcohol; c) providing a catalyst; d) mixing (a), (b), and (c) to form a blend; and e) homogenizing the blend at a pressure greater than 400 kilogram-force per square centimeter (Kg/cm2).

In still another embodiment of the present invention, a system for manufacturing a biofuel includes: a feedstock supply; an alcohol supply; a catalyst supply; a mixing tank in fluid connection with the feedstock supply, alcohol supply, and catalyst supply, the mixing tank being configured to generate a mixture of feedstock, alcohol, and catalyst; a pump in fluid connection with the mixing tank, the pump configured to receive the mixture from the mixing tank and generate a flow of the mixture; and a pressure cannon in fluid connection with the pump, the pressure cannon comprising: a planar member; and a fluid nozzle disposed in cooperative alignment with the planar member, the fluid nozzle being configured to receive the flow of the mixture from the pump and direct the flow of the mixture in a stream at greater than 400 kilogram-force per square centimeter (Kg/cm2) towards the planar member and perpendicular to a face of the planar member, wherein the stream of the mixture is homogenized to generate the biofuel in response to striking the planar member; and a collection tank in fluid connection with the pressure cannon, the collection tank configured to collect and store the biofuel generated by the pressure cannon.

There has thus been outlined, rather broadly, certain embodiments of the invention in order that the detailed description thereof herein may be better understood, and in order that the present contribution to the art may be better appreciated. There are, of course, additional embodiments of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

DETAILED DESCRIPTION

The present invention provides, in some embodiments, a biofuel manufacturing system and a method of manufacturing biofuels. In an embodiment, the invention provides a biofuel manufacturing system for manufacturing various biofuels such as, for example, biodiesel, biofuel oil, bio gasoline or petrol, and the like. In this regard, the term 'bio' refers to the biologically derived nature of at least some portion of the fuel manufactured. Advantages of certain embodiments of the biofuel manufacturing system include one or more of: processing a flow of biofuels; scalability; reducing production costs; reducing byproducts and costs associated with byproduct removal; increasing production rate; and the like. As a result of these advantages, the biofuel manufacturing system may generate a finished biofuel from raw materials in a relatively compact space and in a relatively short amount of time as compared to conventional manufacturing systems.

In addition, the present biofuel manufacturing system is readily adaptable to changes in processing procedures and feedstocks. Chemical processes may be varied according to the feedstock to improve certain characteristics of the biofuel. These chemical processes may include the addition of various catalysts, adjustments to the pH, modulating the temperature and pressure, and agitation, and the like. Examples of characteristics improved by various chemical processing include: octane rating; flow characteristics at various temperatures and pressures; homogeneity; and the like.

Depending upon the particular processing being performed, the biofuel feedstock is subjected to one or more chemical processes with or without agitation for a predetermined amount of time, predetermined amount of pressure, and/or at a predetermined temperature. Due to the flexibility and portability of subunits that make up the biofuel manufacturing system of the present invention, the biofuel manufacturing system may be reconfigured with comparative ease. For example, if, during production, an additional physical or chemical treatment of the biofuel becomes necessary, an additional physical or chemical processing subunit of the biofuel manufacturing system may be integrated. In another example, speed of production may be easily modified by reducing or increasing the number of active subunits. In a conventional system, such a change may require comparatively major re-design and re-tooling.

A fuel pathway is defined by three components (1) fuel type; (2) feedstock; and (3) production process. Essentially, the product disclosed herein is a "non-ester renewable diesel" rather than a "biodiesel" as defined by 40 C.F.R. §80.1401.

As used herein, the expression "at least one" means one or more and thus includes individual components as well as mixtures/combinations.

As used herein, the term "continuous" refers to the simultaneous input of reactants and output of products and/or reactants from a reactor or reaction zone. Furthermore, "continuous" can be used to describe a system wherein the reactants and/or products of the system are not divided into batches prior to entering or immediately after they exit the reactor or separation units of the system.

Unless otherwise indicated, all numbers expressing quantities of ingredients, reaction conditions, and so forth used in the specification and claims are to be understood as being modified in all instances by the term "about." Accordingly, unless indicated to the contrary, the numerical parameters set forth in the following specification and attached claims are approximations that may vary depending upon the desired properties sought to be obtained by the present invention. Other than in the operating examples, or where otherwise indicated, all numbers expressing quantities of ingredients and/or reaction conditions are to be understood as being modified in all instances by the term "about," meaning within 10% to 15% of the indicated number.

A common vegetable-oil-derived fuel, typically used as a fuel for diesel engines is referred to as "biodiesel." A biodiesel fuel used as a fuel and not as an additive with a petroleum based fuel or ethanol, at 100%, is referred to as "B100." If the biofuel is used as an additive with another fuel, such as diesel fuel or gas or oil, the biofuel is typically identified by the percentage of biodiesel present, such as, B5, B20, B30, and so forth.

As used herein, the terms "oils" and "fats" are chemically interchangeable, the distinction between such products being that they are merely distinguished on the basis of their physical state. To avoid confusion with other types of oils, such as essential oils or oils derived from petroleum, these products will be identified to the extent possible as "vegetable or animal oils" or "vegetable or animal fats" but unless the context clearly indicates otherwise, a reference to fats and oils should be understood to refer to vegetable or animal oil components as opposed to petroleum oils. As used herein, the term "oil" can also encompass any biologically derived source of tri-, di-, or mono-acylglycerols however substituted. The term "oil" can encompass, but is not limited to, beef tallow, pork fat, poultry fat, oil from soybeans, cottonseeds, canola, rapeseeds, rice bran, flax seeds, safflowers, cranbe, corn, sunflowers, mustard seeds, palm, peanuts, coconuts, or other vegetable or animal material, used or recycled animal or vegetable oils, other biologically derived oils, oil from annual cover crops, algal oil, biogenic waste oils/fats/greases, or combinations thereof. In one embodiment, the oil used is a vegetable derived oil. Preferably, the oil represents from about 90% to about 99% of the total weight of the composition, more preferably from about 95% to about 98% of the total weight of the composition, and most preferably from about 96% to about 97%, including all ranges and subranges therebetween.

The alcohol employed to react with the oil can be any suitable alcohol or blend of alcohols for carrying out the reaction. Preferably, the alcohol is a short chain alcohol. For example, the alcohol can include one or more monovalent or multivalent alcohols, such as methanol, ethanol, isopropanol, butanol, trimethylpropane, glycerols and other polyols or combinations thereof. Preferably, the alcohol represents from about 1% to about 10% of the total weight of the composition, more preferably from about 2% to about 7% of the total weight of the composition, and most preferably from about 2% to about 4%, including all ranges and subranges therebetween.

The catalyst used can include one or more surfactants, such as nonionic, ionic or partially ionic, anionic, amphoteric, cationic, zwitterionic surfactants or combinations thereof. Particularly preferred surfactants include non-ionic surfactants. Non-limiting non-ionic surfactants include, polyethoxylated and/or polypropoxylated alkyl phenols, alphadiols and alcohols, comprising fatty chains comprising, for example, from 8 to 18 carbon atoms, and the number of ethylene oxide and/or propylene oxide groups may range from 2 to 50. Further, the non-ionic surfactant may be chosen, for example, from copolymers of ethylene oxide and of propylene oxide, condensates of ethylene oxide and/or of propylene oxide with fatty alcohols; polyethoxylated fatty amides comprising, for example, from 2 to 30 mol of ethylene oxide, polyglycerolated fatty amides comprising on average 1 to 5 glycerol, and, for example, 1.5 to 4, glycerol groups; polyethoxylated fatty amines comprising, for example, from 2 to 30 mol of ethylene oxide; oxyethylenated fatty acid esters of sorbitan comprising, for example, from 2 to 30 mol of ethylene oxide; fatty acid esters of sucrose, fatty acid esters of polyethylene glycol, alkylpolyglycosides, N-alkylglucamine derivatives, and amine oxides such as (C.sub.10-C.sub.14) alkyl amine oxides and N-acylaminopropylmorpholine oxides. The catalyst represents from about 0.01% to about 5% of the total weight of the composition, more preferably from about 1% to about 3% of the total weight of the composition, and most preferably from about 1% to about 2%, including all ranges and subranges therebetween.

Generally, in an embodiment of the present invention, a vegetable oil is blended with an alcohol and a catalyst and the blend is processed through a high pressure pump to achieve a microemulsion that will not separate under extreme heat or cold temperatures.

Figure 1:
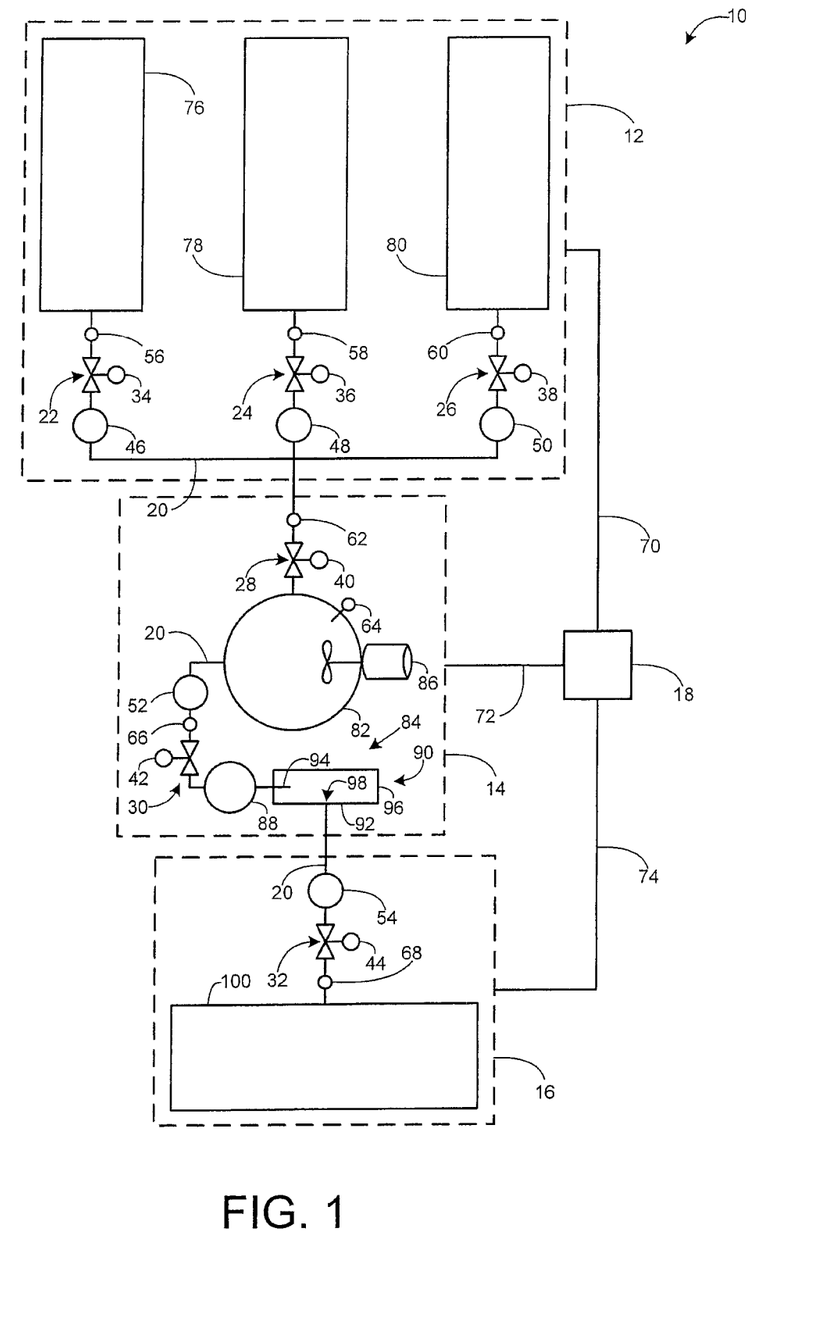
FIG. 1 is block diagram of a biofuel manufacturing system according to an embodiment of the invention.

The invention will now be described with reference to the drawing figures, in which like reference numerals refer to like parts throughout. As shown in FIG. 1, a biofuel manufacturing system ("BMS") 10 includes an inventory of raw materials or supply station 12, a processing station 14, a product station 16, and a control station 18. To fluidly connect the various components of the BMS 10 to one another, the BMS 10 includes one or more supply lines 20. In addition, the BMS 10 may include a plurality of valves 22-32. The valves 22-32 may include any valve suitable for modulating the flow of a fluid. A particular example of a suitable valve includes Tri 750-03-ESP available from Kundinger Controls Products of Auburn Hills, Mich. More particularly, the valves 22-32 may each include a respective solenoid or other such actuator 34-44 configured to modulate the respective valves 22-32 in response to signals from a controller such as the control station 18, for example. A particular example of a suitable actuator includes Radius ES900 available from Kundinger Controls Products of Auburn Hills, Mich. However, in other embodiments, the valves 22-32 may be manually operated. To generate a flow of fluids or otherwise convey fluids between the various components, the BMS 10 includes a plurality of pumps 46-54.

To monitor the flow and/or other parameters of the fluid, the BMS 10 may include a plurality of sensors 56-68. If present, the sensors 56-68 may be configured to sense flow speed, volume, mass, fluid temperature, pressure, and/or the like. A particular example of a suitable sensor includes Badger ER9 available from Kundinger Controls Products of Auburn Hills, Mich. The BMS 10 may include a plurality of control lines 70-74 to communicate between the control station 18 and the various components of the BMS 10. For example, the control lines are configured to transmit signals between the control station 18 and the actuators 34-44, pumps 46-54, and sensors 56-68.

The supply station 12 is configured to receive, store, and/or dispense the inventory of the various raw ingredients used to produce the biofuel. In a particular example, three supply tanks 76, 78, and 80 are included in the supply station 12. However, in other examples, the supply station 12 may include any suitable number of supply tanks or containers. In a particular example, the supply tank 76 is configured to receive, store, and/or dispense a supply of vegetable oil, the supply tank 78 is configured to receive, store, and/or dispense a supply of alcohol, and the supply tank 80 is configured to receive, store, and/or dispense a supply of catalyst. Of note, while the supply tanks 76-80 are shown as being the same relative size, the supply tanks 76-80 need not be the same size but rather, may be any suitable relative or absolute size and may contain any suitable material to make the biofuel. The supply tanks 76-80 are fluidly connected to the processing station 14 via the one or more supply lines 20.

The processing station 14 is configured to generate a mixture and homogenize the mixture to produce the biofuel. The processing station 14 includes a mixing tank 82 and a homogenizer 84. The mixing tank 82 includes a mixer 86 configured to agitate or otherwise mix the contents of the mixing tank 82. The mixer 86 may be configured to operate in response to signals from the control station 18. A particular example of a suitable mixer includes Nettco 5 KB-2-SBS available from Kundinger Controls Products of Auburn Hills, Mich.

Although shown with supply lines 20 going directly from the supply tanks 76-80, it should be understood that various amounts of oil, catalyst or alcohol can be supplied at various times. For example, there may be instances where only oil and alcohol are supplied into the mixing tank 82 at first and mixed. The catalyst can be supplied at a later time. Alternatively, the catalyst and oil can be supplied first and then alcohol at a later time. Thus, various combinations are possible and within the scope of the present invention.

Depending upon the desired throughput of the system, the processing station 14 may further include a 'buffer' tank (not shown) disposed between the mixing tank 82 and homogenizer 84. If included, the buffer tank is configured to receive the mixture from the mixing tank 82 and dispense the mixture to the homogenizer 84. In this manner, the mixing tank 82 may be filled again to generate another batch of the mixture while the previous batch is being homogenized. Such a configuration allows for continuous operation. As many buffer tanks as needed can be utilized with this system.

The homogenizer 84 is configured to receive the mixture from the mixing tank 82 or the buffer tank and homogenize this mixture. In a particular example, the homogenizer 84 includes a pump 88 and cannon 90. The pump 88 is configured to generate greater than 400 kilogram-force per square centimeter "Kg/cm2" (5,689 pounds per square inch "psi") of fluid pressure. Preferably, the pump 86 is configured to generate between about 400 Kg/cm2 to about 700 Kg/cm2 (about 5,689 psi to about 9,956 psi). More preferably, the pump 88 is configured to generate between about 500 Kg/cm2 to about 600 Kg/cm2 (about 7,112 psi to about 8,534 psi). A particular example of a suitable pump includes General Industries SH30 available from Kundinger Controls Products of Auburn Hills, Mich.

Figure 2:
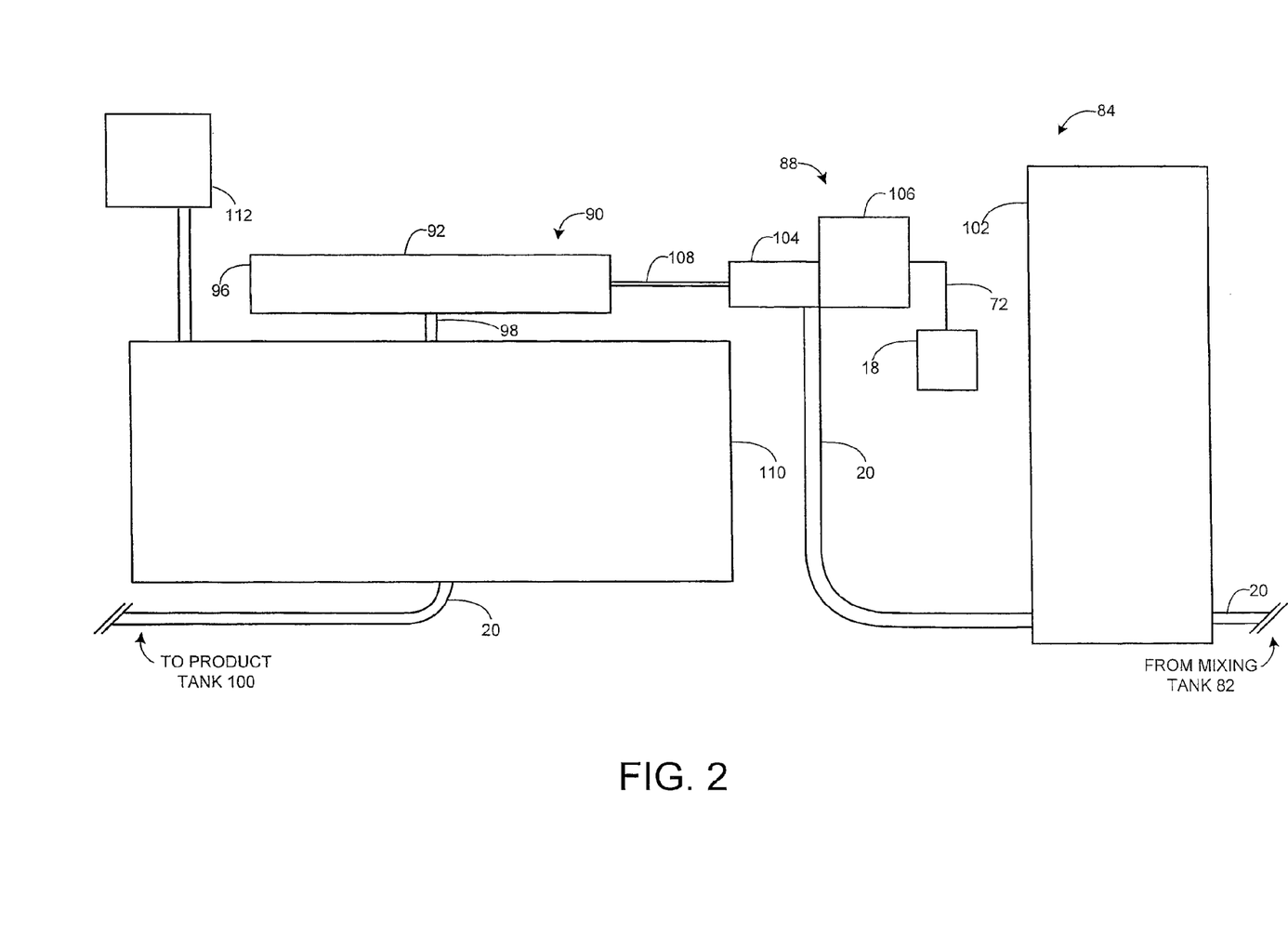
FIG. 2 is a perspective view of a homogenizing cannon assembly according to the system of FIG. 1.
Figure 3:
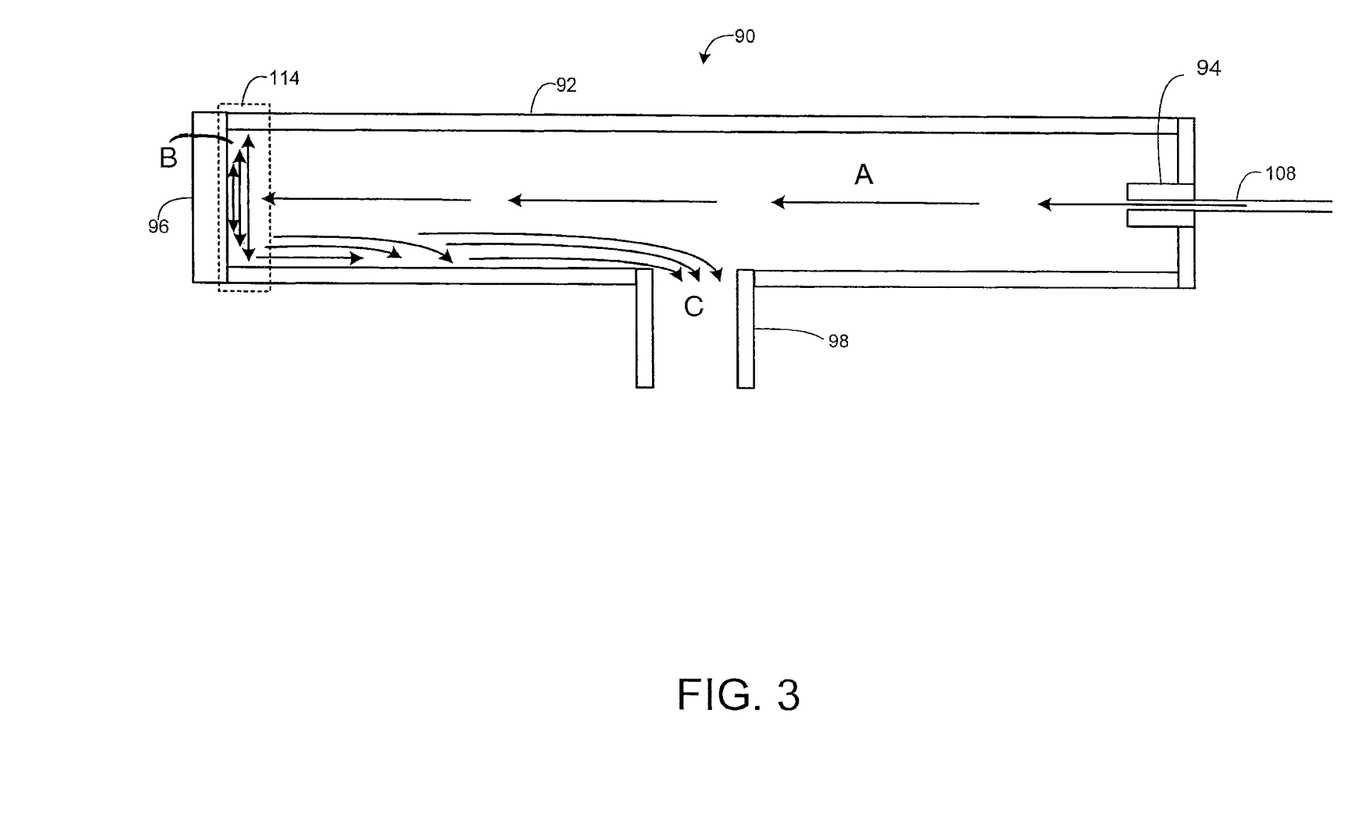
FIG. 3 is a cross sectional view of the homogenizing cannon according to the system of FIG. 1.

FIG. 2 is a side view of the homogenizer 84 assembly according to the system of FIG. 1. FIG. 3 is a cross-sectional view of the cannon 90 according to the system of FIG. 1. As shown in FIGS. 2-3, the cannon 90 includes a body 92, nozzle 94, strike plate 96, and outlet 98. The nozzle 94 is configured to receive a flow of the mixture from the pump 88 and direct the flow along a longitudinal axis of the body 92. The strike plate 96 is a planar member in cooperative alignment with the nozzle 94. A face of the strike plate 96 is perpendicularly disposed relative to a stream of the mixture directed from the nozzle 94. In response to striking the strike plate 96, frictional heat is generated and the stream of fluid is heated and subjected to sufficient shear force or 'shear stress' to homogenize the mixture into a biofuel. No external heating source is required. The outlet 98 is configured to provide an outlet for the biofuel. Upon exiting the homogenizer 84, the biofuel may drain or be pumped to the product station 16.

The product station 16 includes a product tank 100 that is configured to receive the biofuel from the homogenizer 84 and store the biofuel. While not shown, the product tank 98 may include a vent (either powered or unpowered) to vent off excess alcohol or the like. In addition, the product tank 100 may include an outlet and/or outlet conduits to convey the biofuel from the product tank 100 to a transport system such as a tanker truck, pipeline, or the like.

Returning to FIG. 2, the supply line 20 from the mixing tank 82 (shown in FIG. 1) is fluidly connected to a buffer tank 102. The buffer tank 102 is configured to provide a buffering or reserve capacity to reduce cycling of the homogenizer 84 between batches of mixture. Thereafter, the supply line 20 fluidly connects the buffer tank 102 with the pump 88. More particularly, the pump 88 includes a fluid pump 104 driven by a motor 106. The supply line 20 is configured to fluidly connect the buffer tank 102 with the fluid pump 104. Also shown in FIG. 2, the motor 106 and thus the operation of the pump 88 may be modulated by the control station 18.

Operation of the pump 88 is configured to generate a pressurized flow of the mixture which is conveyed along a pressure line 108 to the cannon 90. As described herein, a stream of the mixture is driven into the strike plate 96 to homogenize the mixture. Thereafter, the homogenized biofuel drains out from the cannon 90 via the outlet 98. In an embodiment, the homogenized biofuel flows into a collection tank 110.

The collection tank may be configured to provide an initial venting of the biofuel into the atmosphere or collection device to dissipate any excess ethanol or other such volatile component not integrated into the biofuel. In this regard, the collection tank 110 may include a vent which may be powered and/or naturally aerated. The system may include aeration tanks 112. The aeration tanks 112 evaporate trace alcohol which is beneficial because the flashpoint of the final product can be raised during the process. A higher flash point allows the final product to be transported easily because it is not deemed flammable and hazardous. The trace alcohol so aerated can be captured, condensed and re-introduced into the process from the aeration tanks 112.

The collection tank 110 may further include the supply line 20 configured to convey the biofuel from the collection tank to the product tank 100. As shown in FIG. 3, the pressurized flow of the mixture is provided to the cannon 90 via the pressure line 108. This flow, denoted with arrows marked A, is directed in a stream running along a longitudinal axis of the cannon 90 and is driven into the strike plate 96 at sufficient pressure to homogenize the mixture. In general, a pressure greater than 400 Kg/cm2 (5,689 pounds per square inch "psi") is sufficient to homogenize the mixture. Preferably, the pressure is between about 400 Kg/cm2 to about 700 Kg/cm2 (about 5,689 psi to about 9,956 psi). More preferably, the pressure is between about 500 Kg/cm2 to about 600 Kg/cm2 (about 7,112 psi to about 8,534 psi). In response to striking the strike plate 96 at sufficient pressure, a direction of travel is altered 90° from the longitudinal axis (perpendicular to the longitudinal axis) and is driven outwardly in a radial fashion denoted with arrows marked B.

Without being constrained by any particular theory, this outward flow from the point of impact generates shear stress within a zone 114 due to a flow of the fluid closer to the strike plate 96 experiencing relatively greater friction as compared to a flow of the fluid relatively further from the strike plate 96. The differential friction across the flow causes differences in the relative flow rate generating a shear force or shear stress, as well as heat. This shear stress, together with turbulence of the flow towards the outlet 98 and heating due to the frictional forces, is configured to homogenize the mixture into the biofuel. The homogenized fluid then flows out of the cannon, denoted with arrows marked C. This process is generally illustrated in FIG. 3 by the series of arrows A, B, C, beginning at the pressure line 108, traveling along the longitudinal axis of the cannon 90, striking the strike plate 96, cascading back along an interior bottom surface of the cannon 90 and draining down the outlet 98.

Figure 4:
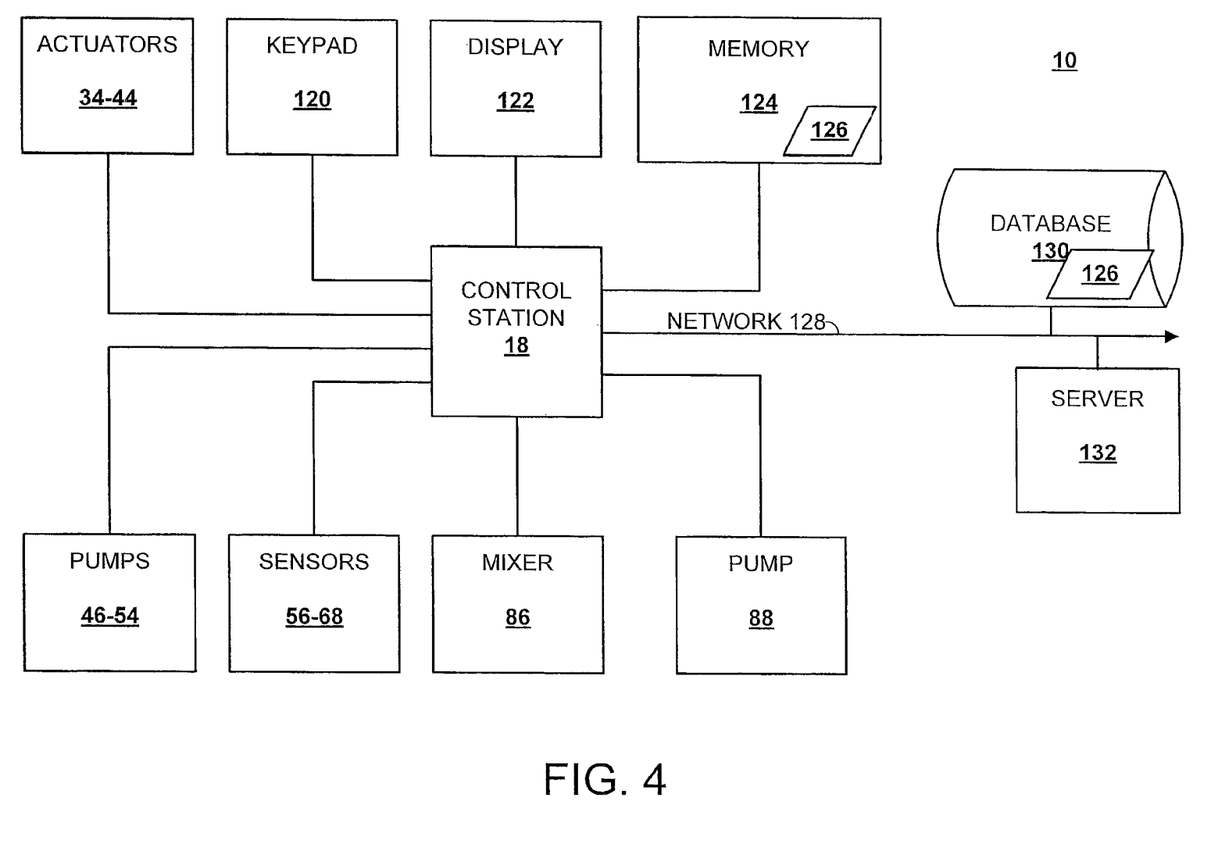
FIG. 4 is a diagram of a system architecture for the biofuel manufacturing system according to the system of FIG. 1.

FIG. 4 is a diagram of a system architecture for the biofuel manufacturing system according to the system of FIG. 1. As shown in FIG. 4, the BMS 10 may be controlled via the control station 18. For example, the control station 18 may be configured to send and/or receive signals from the actuator 34-44, plurality of pumps 46-54, plurality of sensors 56-68, mixer 86, pump 88, and other such suitable components of the BMS 10. The control station 18 may include a user interface such as, for example, a keypad 120 and a display 122. In addition to or alternatively, the user interface may include touch screen device, indicator lights, dials, buttons, speakers, and the like.

The BMS 10 may include a memory 124 configured to provide data storage for the control station 18. For example, the memory 124 may be configured to store sensor readings, date and time stamps, a computer readable file 126, and the like. The file 126 may include computer readable lines of code for performing biofuel production or the like. In addition, the BMS 10 may include a computer network 128 configured to provide access to a database 130 and/or server 132 and a multitude of other networked devices. In this regard, the network 128 may include a local area network (LAN), wide area network (WAN), wireless network, the Internet, and the like.

Figure 5:
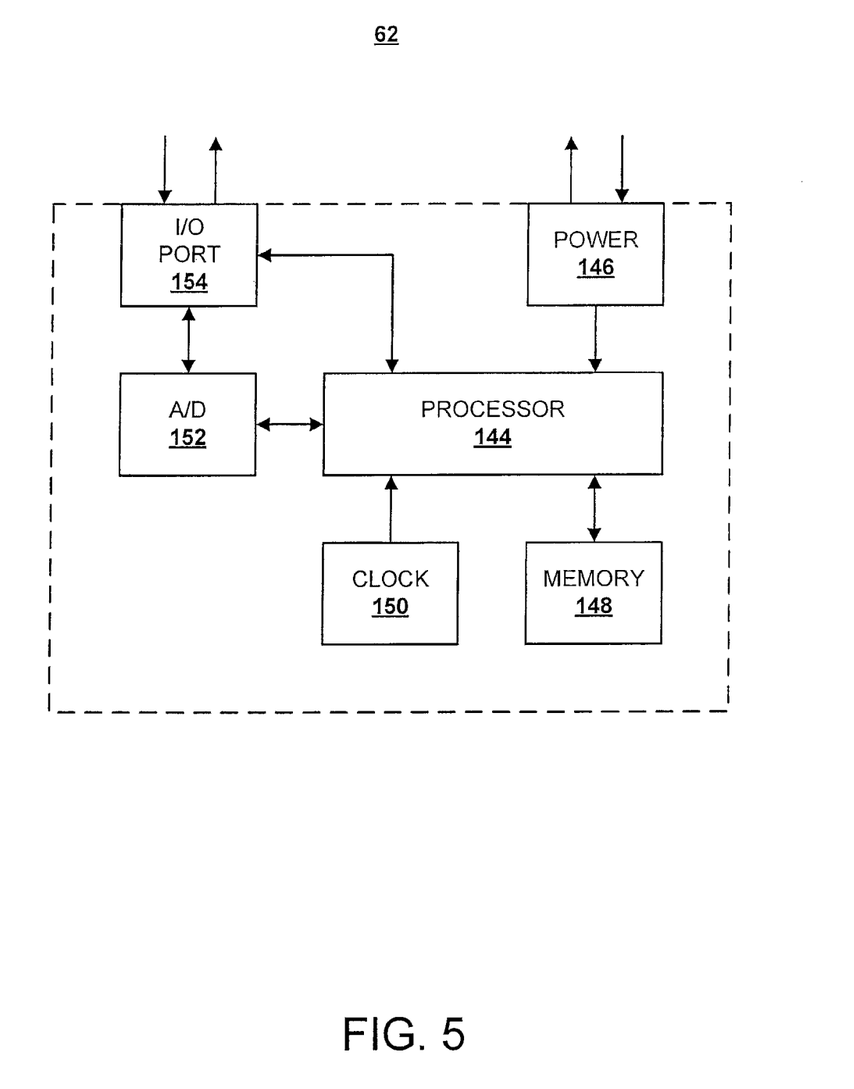
FIG. 5 is a diagram of a system architecture for the control system suitable for use in the system of FIG. 1.

FIG. 5 is a diagram of a system architecture for the control system suitable for use in the system of FIG. 1. As shown in FIG. 5, the control station 18 includes a processor 144. This processor 144 is operably connected to a power supply 146, memory 148, clock 150, analog to digital converter (A/D) 152, and an input/output (I/O) port 154. The I/O port 154 is configured to receive signals from any suitably attached electronic device and forward these signals to the A/D 152 and/or the processor 144. For example, the I/O port 154 may receive signals associated with temperature and/or flow rates from the sensors 56-68 and forward the signals to the processor 144. If the signals are in analog format, the signals may proceed via the A/D 152. In this regard, the A/D 152 is configured to receive analog format signals and convert these signals into corresponding digital format signals. Conversely, the A/D 152 is configured to receive digital format signals from the processor 144, convert these signals to analog format, and forward the analog signals to the I/O port 154. In this manner, electronic devices configured to receive analog signals may intercommunicate with the processor 144.

The processor 144 is configured to receive and transmit signals to and from the A/D 152 and/or the 110 port 154. The processor 144 is further configured to receive time signals from the clock 150. In addition, the processor 144 is configured to store and retrieve electronic data to and from the memory 148. Furthermore, the processor 144 is configured to determine signals operable to modulate and thereby control the actuators 34-44, pumps 46-54 and 88, mixer 86, and various other suitable components.

In a particular example according to an embodiment of the invention, the processor 144 is configured to determine an appropriate amount of fluid to pump from each of the supply tanks 76-80 to generate the mixture. The processor 144 may be configured to monitor the respective amounts of fluid pumped via the signals from the sensors 56-60. In addition, the processor 144 may be configured to determine an amount of time to mix the reagents in the mixing tank 82 e.g., a completion of a cycle time. These and other such commands may be stored to the file 126 (shown in FIG. 4) which may be accessed to execute the computer readable code disposed therein.

In another example, the processor 144 may be configured to supply the catalyst. These reagents are mixed and about 600 parts alcohol are added and mixed. This mixture may be continually agitated for about 24 hours. Thereafter, the catalyst solution may be utilized to generate the biofuel described herein.

Based on experiments conducted using soybean oil as feedstock, the following results were obtained. As shown in Table 1 below, the presently disclosed process is more efficient because there is less land use change (with associated greenhouse gas emissions) and fewer agricultural sector impacts per BTU of fuel produced. As shown in Table 2, the inventive process uses less energy than the soybean biodiesel process, which results in a reduction in green house gas ("GHG") emissions. Advantageously, the inventive process does not have onsite emissions because it does not require onsite combustion of natural gas or other fossil fuels for process energy. Overall, the inventive process results in higher fuel production GHG emission impacts compared to the soybean biodiesel process.

Compared with soybean biodiesel, the non-ester renewable diesel disclosed herein is more efficient and has less GHG impacts related to feedstocks. In the experiments that were conducted, the fuel type and feedstock were similar to conventional processes such as transesterification and hydrotreating. The production process was substantially different. The process disclosed herein uses less soybean oil in terms of oil input per BTU of fuel produced. Thus, the amount of soybeans needed in feedstock transport and production is also reduced. This process also does not produce a co-product that results in an increase in GHG emissions unlike the soybean biodiesel production process. The inventive process results in more fuel produced per amount of raw materials used.

TABLE 1

Comparison of Agricultural Sector and Land Use Change Impacts for Soybean Biodiesel and Non-Ester Renewable Diesel

| Lifecycle Stage | Soybean Biodiesel (g CO2-eq./mmBtu) | Non-Ester Renewable Diesel (g CO2-eq./mmBtu) |
|---|---|---|
| Domestic Livestock | −2,100 | −1,980 |
| Domestic Farm Inputs and Fertilizer N2O | 106 | 100 |
| Domestic Rice Methane | −7,950 | −7,494 |
| Domestic Land Use Change | −8,896 | −8,386 |
| International Livestock | −6,436 | −6,194 |
| International Farm Inputs and Fertilizer N2O | 5,402 | 5,199 |
| International Rice Methane | 2,180 | 2,098 |
| International Land Use Change | 42,543 | 40,947 |
| Total Feedstock Production Emissions: | 24,848 | 24,290 |

TABLE 2

Comparison of Fuel Production Emissions for GER Renewable Diesel and Soybean Biodiesel

| Lifecycle Stage (soybean crushing and fuel production) | Soybean Biodiesel (g CO2-eq./mmBtu) | Non-Ester Renewable Diesel (g CO2-eq./mmBtu) |
|---|---|---|
| On-Site Emissions | 9,486 | |
| Upstream (natural gas, catalyst and electricity production) | 9,312 | 15,346 |
| Co-Product Credit | −5,645 | 0 |
| Total Fuel Production Emissions: | 13,153 | 15,346 |

Using the BMS 10 system described above, a microemulsion finished product is created that does not separate under extreme heat or cold temperatures. The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. A system for manufacturing a biofuel, the system comprising: a feedstock supply; an alcohol supply; a surfactant supply; a mixing tank in fluid connection with the feedstock supply, alcohol supply, and surfactant supply, the mixing tank being configured to generate a mixture of feedstock, alcohol, and surfactant;
   a pump in fluid connection with the mixing tank, the pump configured to receive the mixture from the mixing tank and generate a flow of the mixture; and
   a pressure cannon in fluid connection with the pump, the pressure cannon comprising:
   a planar member; and a fluid nozzle disposed in cooperative alignment with the planar member, the fluid nozzle being configured to receive the flow of the mixture from the pump and direct the flow of the mixture in a stream at greater than 400 kilogram-force per square centimeter ($Kg/cm^2$) towards the planar member in a radial fashion and perpendicular to a face of the planar member, wherein the stream of the mixture is homogenized to generate the biofuel in response to striking the planar member; and
   a collection tank in fluid connection with the pressure cannon, the collection tank configured to collect and store the biofuel generated by the pressure cannon.

2. The system according to claim 1, wherein the mixing tank is a zero dead volume mixing tank.

3. The system according to claim 1, further comprising a transfer buffer tank fluidly interposed between the mixing tank and the pressure cannon.

4. The system according to claim 1, further comprising a plurality of pressure cannons.

5. The system according to claim 4, further comprising a plurality of collection tanks, wherein each pressure cannon of the plurality of pressure cannons includes a respective collection tank of the plurality of collection tanks.

6. The system according to claim 5, further comprising a plurality of pumps, wherein each pressure cannon of the plurality of pressure cannons includes a respective pump of the plurality of pumps.

7. The system according to claim 1, further comprising a vent in fluid connection with the collection tank, the vent being configured to facilitate aeration of the collected biofuel.

8. The system according to claim 1, further comprising an aeration tank to aerate the biofuel, the aeration tank being in fluid connection with the collection tank.

9. The system according to claim 1, further comprising: a feedstock supply pump; an alcohol supply pump; and a surfactant supply pump.

10. The system according to claim 9, further comprising a controller configured to control the feedstock supply pump, the alcohol supply pump, and the surfactant supply pump.

* * * * *